UNITED STATES PATENT OFFICE.

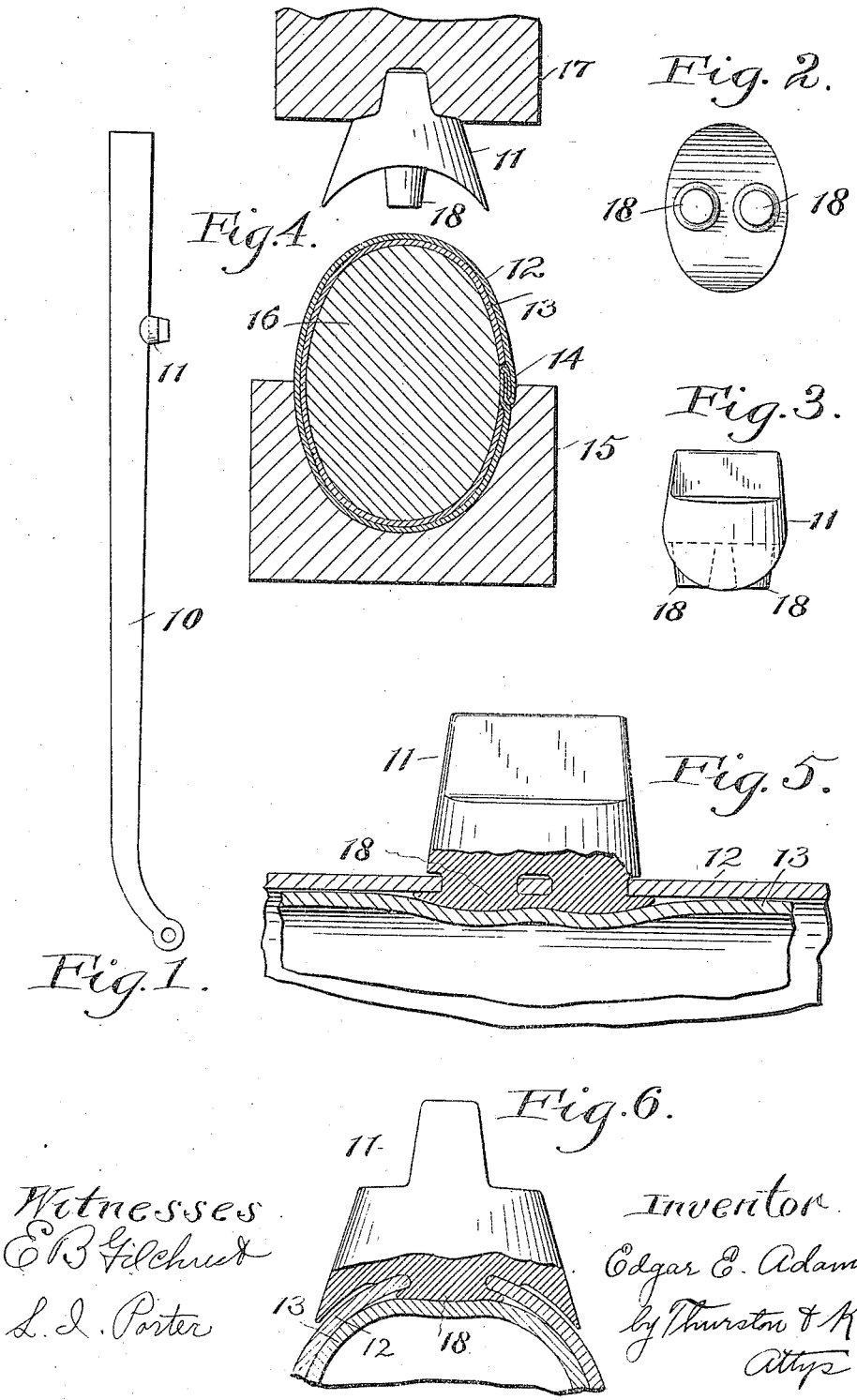

EDGAR E. ADAMS, OF CLEVELAND, OHIO, ASSIGNOR TO THE CLEVELAND HARDWARE COMPANY, OF CLEVELAND, OHIO, A CORPORATION OF OHIO.

BOW-SOCKET.

1,307,105.   Specification of Letters Patent.   Patented June 17, 1919.

Application filed December 21, 1914.   Serial No. 878,242.

*To all whom it may concern:*

Be it known that I, EDGAR E. ADAMS, a citizen of the United States, residing at Cleveland, in the county of Cuyahoga and State of Ohio, have invented a certain new and useful Improvement in Bow-Sockets, of which the following is a full, clear, and exact description.

This invention relates to bow sockets, and has particular reference to the welding of bow separators to bow sockets employed in the tops of automobiles and other vehicles.

The principal object of the present invention is to weld an object such as a bow separator on to a member such as a bow socket in such a manner that a good union is effected and the thin metal of the socket is not burned to any detrimental degree.

Prior to my invention it has been almost the universal practice to secure bow separators to bow sockets by screws or rivets. This is rather expensive and in many instances the joints are defective and unsightly.

I secure a very good union between the separator and socket in an exceedingly short space of time and at very low expense by welding the two together by means of electricity.

In carrying out my invention in its preferred form, I localize or confine to the central part of the separator the current and heat which passes between the separator and socket where they engage each other, and thus avoid the liability of burning or weakening the metal of the socket at and immediately around the separator. On the other hand, the burning that does take place is taken advantage of in securing one of the most effective features of the union.

My invention may be further briefly summarized as consisting in certain novel details of construction and combinations and arrangements of parts which will be described in the specification and set forth in the appended claims.

In the accompanying sheet of drawings wherein I have illustrated my invention, Figure 1 is a side view of a bow socket with a separator attached; Figs. 2 and 3 are bottom and side views of a separator on an enlarged scale; Fig. 4 is a view illustrating the manner in which the separator is applied and welded to the socket; Fig. 5 is a longitudinal sectional view through a portion of the socket after the separator has been welded thereto, a portion of the separator being broken away; and Fig. 6 is a similar view with the section taken transversely of the socket.

Referring now to the drawing, 10 represents a bow socket and 11 a separator which consists preferably of a steel forging and is welded to the socket in accordance with my invention, both the socket and the separator being commonly employed in vehicle top constructions, although as before said it has been customary to fasten the separator to the socket by screws or rivets. Ordinarily, the socket consists of two thin concentric tubes 12 and 13 of sheet metal, the two tubes being employed for the reason that it is difficult to form a satisfactory and sufficiently attractive seam at 14 with a single tube having the necessary thickness. Occasionally, three tubes are employed, the use of more than a single tube being to provide a socket having the necessary stiffness. In welding the separator 11 to the socket 10, a mandrel 16 of good conducting material, such as copper or brass is driven into the open end of the socket. Then the socket is placed in a suitable support 15, such as shown in Fig. 4; and the separator 11 is placed in an opening in the lower side of a vertically movable plunger 17. Thence the separator is pressed against the socket with appropriate pressure by lowering the plunger 17 and at the same time a heavy current of electricity is passed through the socket and separator.

In view of the thinness of the metal of the socket, if the entire curved lower face of the separator were allowed to engage the correspondingly curved surface of the socket at the time the heat and pressure is applied, the joint would be unreliable for the reason that in many or in the majority of instances the metal of the socket around the separator would be seriously burned and weakened. To avoid this disadvantage, I employ a separator having on its curved face, that is the face which is to engage the socket, one or more, preferably, two, lugs, projections or teats 18 which are arranged in the middle portion, that is on the center line of the separator, as shown in Figs. 2, 3 and 4.

In consequence, when the separator is pressed down on to the socket, and the heating current passes between the socket and separator, heat is localized or confined to the middle portion of the separator, causing the projections to be raised to a very high temperature almost simultaneously with the contacting of the projections with the socket. The projections burn their way through the outer tube 12 and come in contact with the inner tube 13 and simultaneously with the passage of the projections through the tube 12, the said projections soften and are spread substantially as illustrated in Figs. 5 and 6, producing an upsetting or riveting effect between the two tubes, as illustrated. The plunger 17 is thence elevated, stopping the heating and welding operation, the plunger being raised at such a point in the cycle of operations that the separator is effectively welded on to both tubes and before the inner end of the separator burns through the inner tube 13. In consequence, a riveting or upsetting effect is produced as far as the joint between the separator and the outer tube is concerned, and at the same time the middle portion of the separator is welded on to the outer tube 12 and the part of the separator which previously constituted the projections 18 now flattened and expanded, as illustrated, is welded on to the inner portion of the outer tube and the outer portion of the inner tube.

This entire operation takes place in an exceedingly short space of time, the lifting of the plunger at the completion of the welding following almost immediately after the lowering of the plunger, with the result that the union is made in approximately one second of time.

While I have shown a separator provided with two of the lugs or projections 18, I do not wish to be confined to this number as a single projection or more than two projections may be employed, the particular number depending upon the circumstances or the conditions encountered.

Having thus described my invention, what I claim is:—

1. A bow socket composed of inner and outer concentric sheet metal tubes having a separator welded to both tubes and upset or expanded between the tubes.

2. A bow socket composed of inner and outer concentric sheet metal tubes provided with a separator which is welded to the outer tube and has a portion extending through the outer tube only and expanded between the tubes and welded to the inner tube.

3. A bow socket composed of inner and outer concentric tubes provided with a separator which is welded to the outer tube and which extends through the outer tube only, and has its inner portion expanded and welded to the outer surface of the inner tube.

In testimony whereof, I hereunto affix my signature in the presence of two witnesses.

EDGAR E. ADAMS.

Witnesses:
E. B. GILCHRIST,
L. I. PORTER.